March 30, 1965 M. KATZENSTEIN 3,175,666
CENTRIFUGAL CLUTCH
Filed April 13, 1961
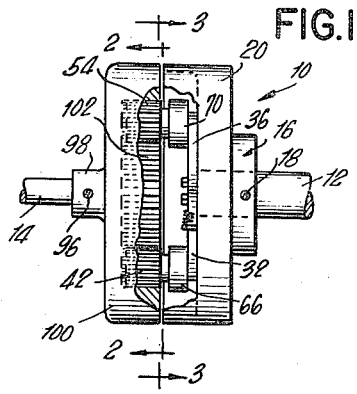
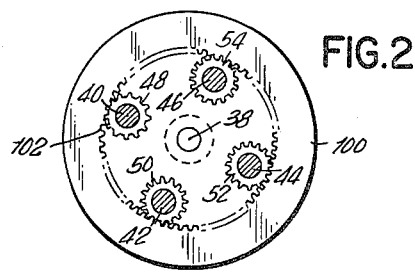
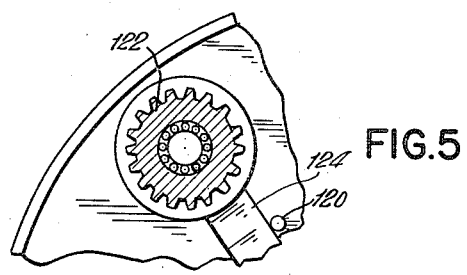
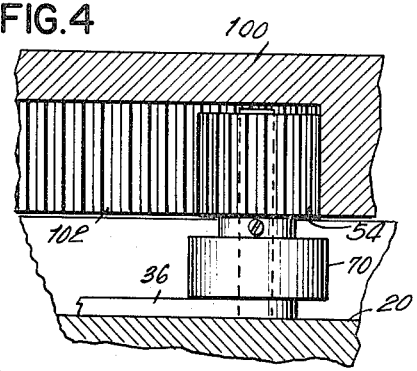
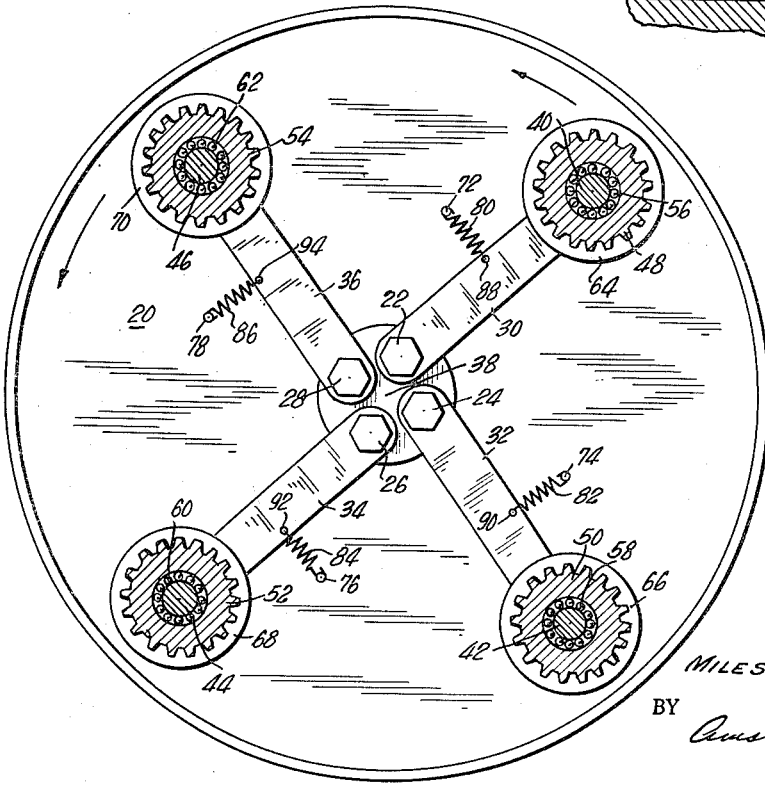
INVENTOR.
MILES KATZENSTEIN
BY Amster & Levy
ATTORNEYS

United States Patent Office 3,175,666
Patented Mar. 30, 1965

3,175,666
CENTRIFUGAL CLUTCH
Miles Katzenstein, 87 Marion Ave., Mount Vernon, N.Y.
Filed Apr. 13, 1961, Ser. No. 102,892
2 Claims. (Cl. 192—103)

This invention relates to motion transmission mechanisms and more particularly to a clutch assembly for interconnecting a drive member with a driven member when the drive member has come up to a predetermined speed.

It is an object of this invention to provide means for rotating a driven member in accordance with the speed of rotation of a drive member and wherein the mechanical connection between the drive member and the driven member is not effective until the drive member has come up to a predetermined speed.

Various types of machines and mechanisms including lathes, cutting and drilling tools, other power tools, automobiles and other vehicles, ships, aircraft, farm machinery, laboratory equipment, manufacturing machinery and numerous others of the like are not ready for effective use until a predetermined speed has been reached. In order to allow the prime mover to reach its predetermined operating speed as rapidly as possible, it is desirable that substantially no load should be applied until the operating speed has been reached. It is therefore another object of the invention to provide a centrifugal clutch which will become operative to interconnect a driven member with a drive member only when rated speed of the drive member is attained so that the driven member connected to the load is not being rotated until operating speed is achieved.

In accordance with an illustrative embodiment of the invention, there is a link pivoted to a drive member at a location offset from the axis of rotation of the drive member. A pinion is rotatably mounted on the end of the link and continuously engages a ring gear forming part of the driven member. When the drive member rotates at a sufficient speed, centrifugal force will overcome the rolling engagement between the ring gear teeth and the teeth of each pinion and cause a binding action and connection therebetween. Hence, at the predetermined and sufficient speed, there is no relative movement between pinion and ring gear and at rated operating speed the drive member is mechanically linked to the driven member for rotation thereof.

A further object of the invention is to provide a centrifugal clutch with means for preventing disengagement of the pinions of the clutch from the ring gear to assure against breakdown of operation of the centrifugal clutch.

Still further objects and features of this invention reside in the provision of a centrifugal clutch that is simple in construction, capable of being produced in various sizes so as to allow for use in divergent fields, and which is relatively inexpensive to produce.

These, together with the various ancillary objects and features of the invention which will become apparent as the following description proceeds, are attained by this clutch assembly, a preferred embodiment of which is illustrated in the accompanying drawing, by way of example only, wherein:

FIG. 1 is an elevational view of the clutch assembly, with parts of the housing being broken away to show other parts in detail;

FIG. 2 is a vertical sectional view taken along line 2—2 in FIG. 1 illustrating the meshing of the pinions and ring gear;

FIG. 3 is a vertical sectional view in an enlarged scale taken along line 3—3 in FIG. 1;

FIG. 4 is a sectional detail view of a portion of the clutch assembly showing a pinion in engagement with the ring gear; and FIG. 5 is a partial sectional view similar to part of FIG. 3, but illustrating a modified form of the invention.

With continuing reference to the accompanying drawing, wherein like reference numerals designate similar parts throughout the various views, reference numeral 10 generally designates an illustrative embodiment of the clutch assembly comprising the present invention. The clutch assembly 10 is used for selectively connecting a drive shaft 12 to a driven shaft 14 for transmission of rotational motion.

The clutch assembly 10 includes a drive member 16 fixed to the drive shaft 12 by means of a set screw 18, or the like. The drive member 16 is provided with a housing section 20 for inclosing moving parts of the clutch assembly 10. The housing 20 may be of any suitable shape but is shown as being cylindrical in shape.

By means of pins or bolts 22, 24, 26 and 28, or other like means, links 30, 32, 34 and 36 are pivoted to the drive member 16 at positions offset from the axis of rotation 38. Fixed to the links 30, 32, 34 and 36 at the ends thereof remote from the pins 22, 24, 26 and 28 are shafts 40, 42, 44 and 46. Mounted on these shafts are pinions 48, 50, 52 and 54 which are journalled for rotation on bearings 56, 58, 60 and 62 respectively. Also mounted on the shafts are weights 64, 66, 68 and 70 formed of a suitable heavy metal or alloy thereof.

Connected at 72, 74, 76 and 78 to the drive member 16 are ends of springs 80, 82, 84 and 86 which are connected at their ends to the links 30, 32, 34 and 36 at 88, 90, 92 and 94.

Secured to the driven shaft 14 in any suitable manner, such as by set screw 96, is a driven member 98 including a housing section 100 which cooperates with housing section 20 to conceal and protect the moving parts of the clutch assembly 10. The housing section 100 is of a generally cylindrical conformation and on the inner surface thereof there is either integrally formed or separately attached thereto an internal gear or ring gear 102. The pinions 48, 50, 52 and 54 mesh with the ring gear and are yieldingly pulled into and maintained in engagement with the ring gear 102 by action of the springs 80, 82, 84 and 86.

It is to be recognized that the combined length of each of the links 30, 32, 34 and 36 with their respective pinions 48, 50, 52 and 54 is greater than the radial distance between the pins 22, 24, 26 and 28 and the ring gear 102. Thus, because of the action of the springs 80, 82, 84 and 86, the pinions 48, 50, 52 and 54 are always maintained in engagement with the ring gear 102.

As the prime mover which causes rotation of the drive shaft 12 is started, the drive member 16 will rotate, causing rotation of the pinions 48, 50, 52 and 54 about the axis of rotation 38 of the drive member 16. The pinions 48, 50, 52 and 54 being in mesh with the ring gear 102 will rotate about their respective shafts 40, 42, 44 and 46 while having a rolling action with respect to the ring gear 102. As the drive member increases speed, the pinions, assisted by the mass of the weights 64, 66, 68, 70 will be pressed against the ring gear with increasing centrifugal force. This force will be transferred tangentially by the pinions 48, 50, 52 and 54 causing the slow rotation of the driven member. When the drive shaft 12 has reached a predetermined speed, the centrifugal force is sufficient to cause the pinions 48, 50, 52 and 54 to bind with the ring gear at which time the driven member 98 will rotate with the drive member 16 as it is at that time mechanically coupled thereto.

In FIG. 5 there is shown a modified form of the invention in which in lieu of springs 80, 82, 84 and 86, a plurality of stop pins 120 are employed for preventing complete dislocation of the pinions 122 and disengagement of the pinions 122 from the ring gear while allowing movement of links 124 away from the stop pins 120 to engage the ring gear due to centrifugal force. The stop pins 120 are engaged by the links 124 and prevent pivoting of the links 124 in the direction which would disengage the pinions from the ring gear.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A clutch assembly comprising a drive member having an axis of rotation, a first cylindrical housing section fixed to said drive member, a plurality of links within said first housing section and pivoted to said drive member at positions equally offset from said axis of rotation, a driven member including a second cylindrical housing section closely spaced to and opposing said first housing section, said second housing section having on its inner cylindrical wall a toothed ring gear, a plurality of toothed pinions each extending into said second housing section and engaging and meshing with said ring gear, said pinions each being rotatably mounted on one of said links, the combined length of a link and associated pinion from its respective pivot position being greater than the shortest radial distance between said respective pivot position and said ring gear so that upon rotation of said drive member said pinion due to centrifugal force will bind with said ring gear, and a weight mounted on each of said links for increasing binding action between said pinions and said ring gear upon rotation of said drive member, said weights being disposed in said first housing section.

2. A clutch assembly according to claim 1, including springs secured to each of said links and to said first housing resiliently urging said pinions into engagement with said ring gear.

References Cited in the file of this patent

UNITED STATES PATENTS

| | | |
|---|---|---|
| 1,139,566 | Ogburn | Mar. 18, 1915 |
| 1,864,256 | Nardone | June 21, 1932 |
| 2,588,482 | Chapman | Mar. 11, 1952 |
| 2,959,071 | Wallach | Nov. 8, 1960 |

FOREIGN PATENTS

| | | |
|---|---|---|
| 308,495 | Great Britain | Mar. 28, 1929 |
| 744,254 | France | Jan. 21, 1933 |